(12) United States Patent
Nikonov (10) Patent No.: US 7,547,907 B2
(45) Date of Patent: Jun. 16, 2009

(54) NON-BLOCKING SWITCH HAVING CARBON NANOSTRUCTURES AND MACH-ZEHNDER INTERFEROMETER

(75) Inventor: Dmitri E. Nikonov, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 11/026,282

(22) Filed: Dec. 29, 2004

(65) Prior Publication Data
US 2006/0139207 A1    Jun. 29, 2006

(51) Int. Cl.
*H01L 29/06* (2006.01)
(52) U.S. Cl. .................... 257/9; 257/24; 257/E29.168
(58) Field of Classification Search .................. 257/9, 257/24, E29.168
See application file for complete search history.

(56) References Cited

U.S. PATENT DOCUMENTS

| | | | | | |
|---|---|---|---|---|---|
| 4,550,330 | A | * | 10/1985 | Fowler | 257/24 |
| 5,105,232 | A | * | 4/1992 | del Alamo et al. | 257/24 |
| 5,148,242 | A | * | 9/1992 | Tsukaka et al. | 257/24 |
| 5,367,274 | A | * | 11/1994 | Thylen | 333/103 |
| 5,521,735 | A | * | 5/1996 | Shimizu et al. | 398/212 |
| 6,501,845 | B2 | * | 12/2002 | Gotoh et al. | 381/412 |
| 6,933,583 | B2 | * | 8/2005 | Kunkee et al. | 257/431 |
| 7,005,669 | B1 | * | 2/2006 | Lee | 257/21 |

OTHER PUBLICATIONS

Heller, E.K. et al., "Simulation of One-Dimensional Ring Quantum Interference Transistors Using the Time-Dependent Finite-Difference Beam Propagation Method", Journal of Applied Physics, Jun. 1, 2000, pp. 8080-8087, vol. 87, No. 11, American Institute of Physics.

Likharev, Konstantin, "Electronics Below 10nm", State University of New York, Stony Brook, NY 11794-3800.

Okuda, Masahiro, "Electrostatically Controlled Double-Quantum-Wire Electron Interferometers", Journal of Applied Physics, Jul. 15, 1995, pp. 1039-1049, vol. 78, No. 2, American Institute of Physics.

De Heer, Walt, "From Carbon Nanotubes to Patterned Graphite Nanoelectronics", Georgia Institute of Technology, pp. 1-27.

Webb, Richard A. et al., "Phase Coherence Over Thousands of Lattice Spacings in Disordered Metals can Produce Quantum Interference Effects in Electrical Resistance Measured in Very Small Devices", Physics Today, Dec. 1988, pp. 46-53, American Institute of Physics.

* cited by examiner

*Primary Examiner*—Evan Pert
(74) *Attorney, Agent, or Firm*—Blakely, Sokoloff, Taylor & Zafman LLP (57) ABSTRACT

In embodiments of the present invention, a non-blocking quantum interference switch includes a segmented electron wave coupler that splits an electron wave and couples its two parts to two arms of a Mach Zehnder interferometer. A voltage may be applied to an interferometer gate electrode to change the phase of the electron wave traveling in that arm. A second segmented electron wave coupler may receive the two electron waves from the interferometer arms and recombine them into one electron wave. If the two electron waves interfere constructively, then the recombined electron wave exits through one switch output port, which may be a "logical zero" switch port, and if the two electron waves interfere destructively, then the recombined electron wave exits through a second switch output port, which may be a "logical one" switch port.

12 Claims, 7 Drawing Sheets

NON-BLOCKING SWITCH HAVING CARBON NANOSTRUCTURES AND MACH-ZEHNDER INTERFEROMETER

BACKGROUND

1. Field

Embodiments of the present invention relate to electronic switches and, in particular, to quantum interference switches.

2. Discussion of Related Art

Switches are used in a variety of devices, such as microprocessors, application specific integrated circuits (ASIC), memory chips, and the like. Currently available switches have limitations, however, in that most of them are based on a field effect. For example, the electric field caused by the applied voltage changes the barrier height for electrons or holes in the switch and thus, either passes or blocks the current through the switch.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
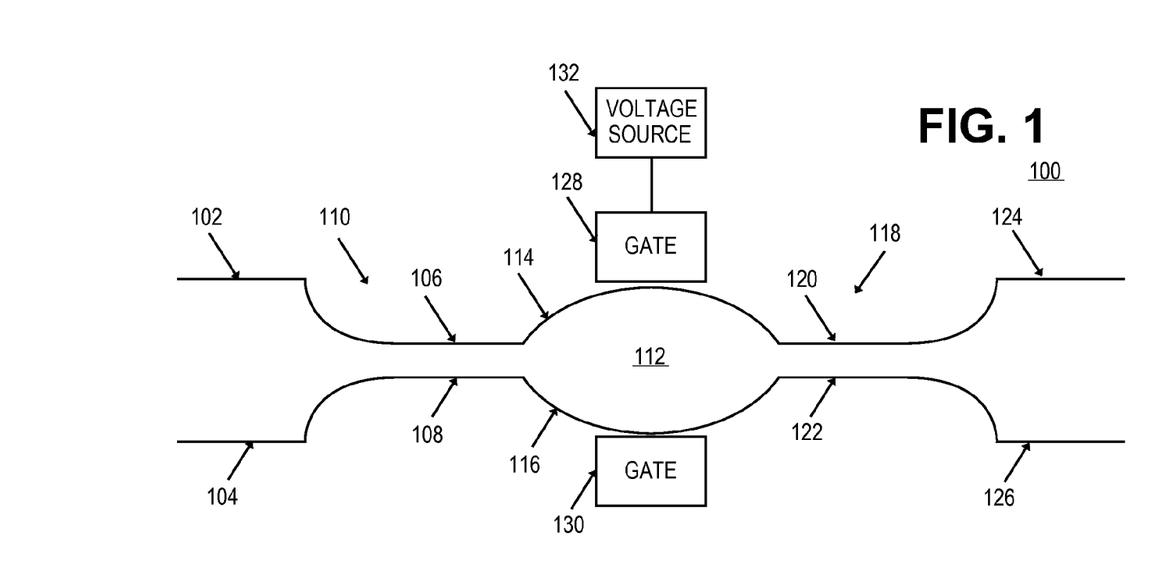
FIG. 1 is a schematic diagram of a quantum interference switch according to an embodiment of the present invention.

FIG. 1 is a schematic diagram of a switch 100, such as a non-blocking quantum interference switch, for example, according to an embodiment of the present invention. In the illustrated embodiment, the switch 100 includes two input ports 102 and 104, which are coupled to two electron waveguides 106 and 108, respectively, of a segmented coupler 110. The coupler 110 is coupled to a Mach Zehnder interferometer 112 in that the electron waveguide 106 is coupled to one arm 114 of the interferometer 112 and the electron waveguide 108 is coupled to a second arm 116 of the interferometer 112.

In the illustrated embodiment, the interferometer 112 is coupled to a second segmented coupler 118 in that the arm 114 is coupled to one electron waveguide 120 of the coupler 118 and the arm 116 is coupled to a second electron waveguide 122 of the coupler 118. The electron waveguide 120 is coupled to an output port 124 and the electron waveguide 122 is coupled to an output port 126. In the illustrated embodiment, a metal gate 128 is adjacent to the arm 114 of the interferometer 112 and a metal gate 130 is adjacent to the arm 116 of the interferometer 112. A voltage source 132 may be coupled to the gate 128. Although not shown a voltage source may be coupled to the gate 130. In one embodiment, the switch 100 may comprise graphite nanowires. In an alternative embodiment, the switch may comprise semiconductor wires.

Figure 2:
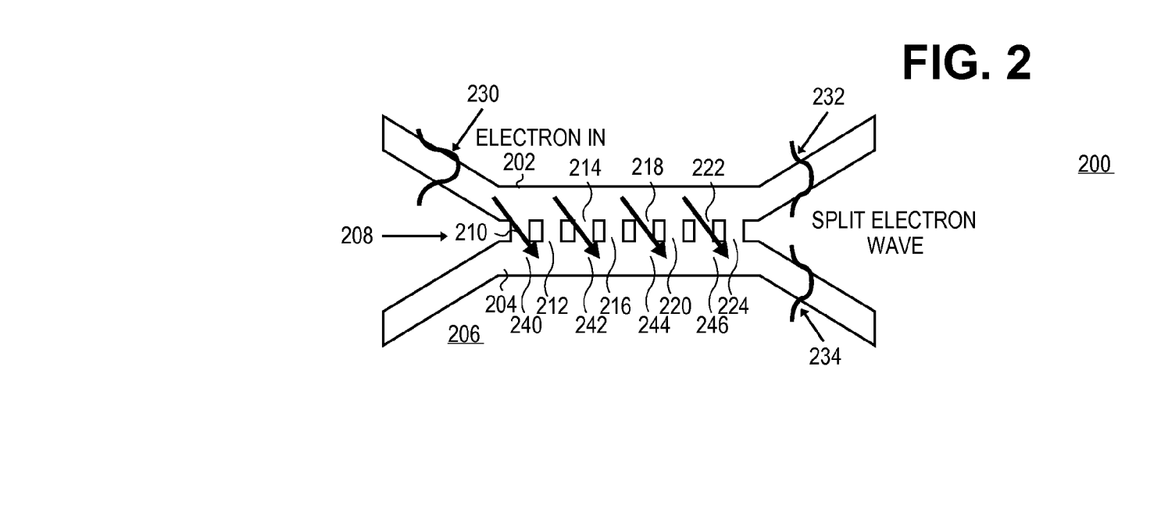
FIG. 2 is a schematic diagram of a waveguide coupler according to an embodiment of the present invention.

FIG. 2 is schematic diagram of a waveguide coupler 200 according to an embodiment of the present invention, such as the waveguide couplers 110 and/or 118. In the illustrated embodiment, the coupler 200 includes two electron waveguides 202 and 204 disposed on a base 206. In the illustrated embodiment, the second electron waveguide 204 is substantially parallel to the first electron waveguide 202.

In the illustrated embodiment, the coupler 200 is segmented using a third set of electron waveguides segments 208 disposed on the base 206 perpendicular to and sequentially in relation to the longitudinal axes of the first and the second electron waveguides 202 and 204. The individual electron waveguides 210, 212, 214, 216, 218, 220, 222, and 224 in the third set of electron waveguides 208 have ends in contact with the first and the second electron waveguides as depicted in FIG. 2.

Figure 3:
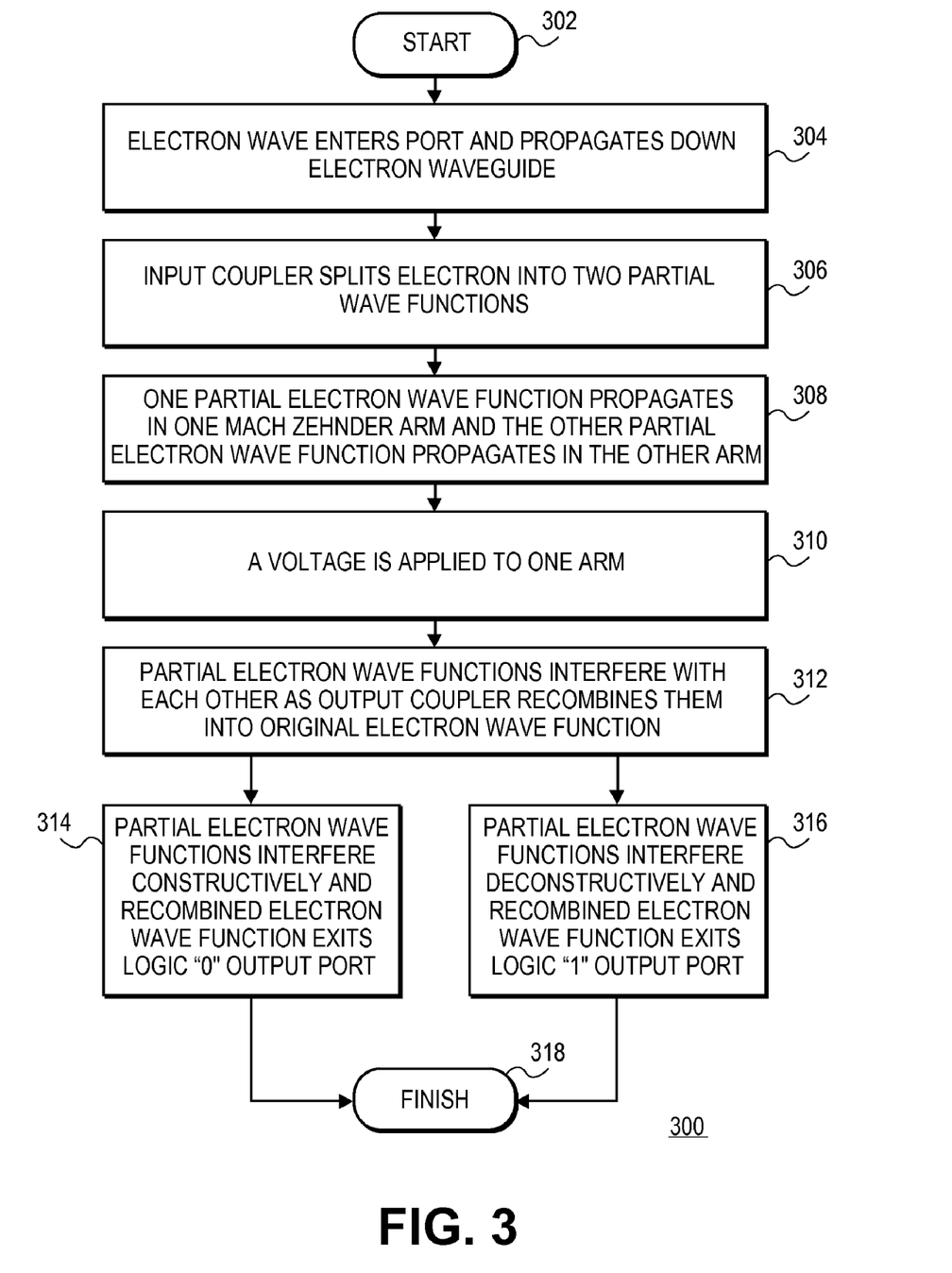
FIG. 3 is a flow chart illustrating an approach to operating a quantum interference switch according to an embodiment of the present invention.

FIG. 3 is a flow chart illustrating a process 300 for operating the switch 100 according to an embodiment of the present invention. The process 300 begins with a block 302, where control passes to a block 304. Reference now will be made to the coupler 200 to explain operations of the coupler 110 according to an embodiment of the present invention.

In the block 304, one or more electrons may enter the port 102 and propagate down the electron waveguide 202.

In a block 306, as the electrons propagate down the electron waveguide 202, the coupler 200 may split the electron into two waves. For example, according to quantum mechanics, electrons have wavelike properties, and as the electrons propagate down the electron waveguide 202, portions of the electron wave are leaked from the electron waveguide 202 to the electron waveguide 204 through the electron waveguides 210, 212, 214, 216, 218, 22, 222, and 224 so that at the outputs of the waveguides 202 and 204 there are two separate electron waves. The arrows 240, 242, 244, and 246 indicate the direction of electron wave leakage according to an embodiment. In the illustrated embodiment, an electron wave 230 entering the electron waveguide 202 exits the electron waveguide 202 as an electron wave 232 and exits the electron waveguide 202 as an electron wave 234.

The size and geometry of the coupler 200 may determine the coupling factor that determines the amount of leakage from one waveguide to another for the coupler 200. In one embodiment, the electron waves 232 and 234 may individually include approximately fifty percent of the density of the electron wave 230. Alternatively, the electron waves 232 may be less than approximately fifty percent of the density of the electron wave 230 and the electron waves 234 may be more than approximately fifty percent of the density of the electron wave 230. Alternatively still, the electron waves 232 may be more than approximately fifty percent of the density of the electron wave 230 and the electron waves 234 may be less than approximately fifty percent of the density of the electron wave 230.

In embodiments of the present invention, the coupler 200 may include nanowires that are surrounded by a dielectric. The dielectric may form a potential barrier on the order of a few volts so that, in most cases the penetration of the electronic wave 230 into the barrier is negligible. This may reduce an overlap of waves in the two separate electron waveguides 202 and 204 and make creating an evanescent coupler highly unlikely.

In one embodiment, the size of the an individual electron waveguides 210, 212, 214, 216, 218, 220, 222, and 224 is comparable to the de Broglie wavelength of the electron wave 230; tunneling in the lateral direction from the one end of an individual the electron waveguide 210, 212, 214, 216, 218, 220, 222, and 224 happens; and the part of the electron wave 230 is transferred into the neighboring electron waveguide 204 as electron wave 234.

Figure 4:
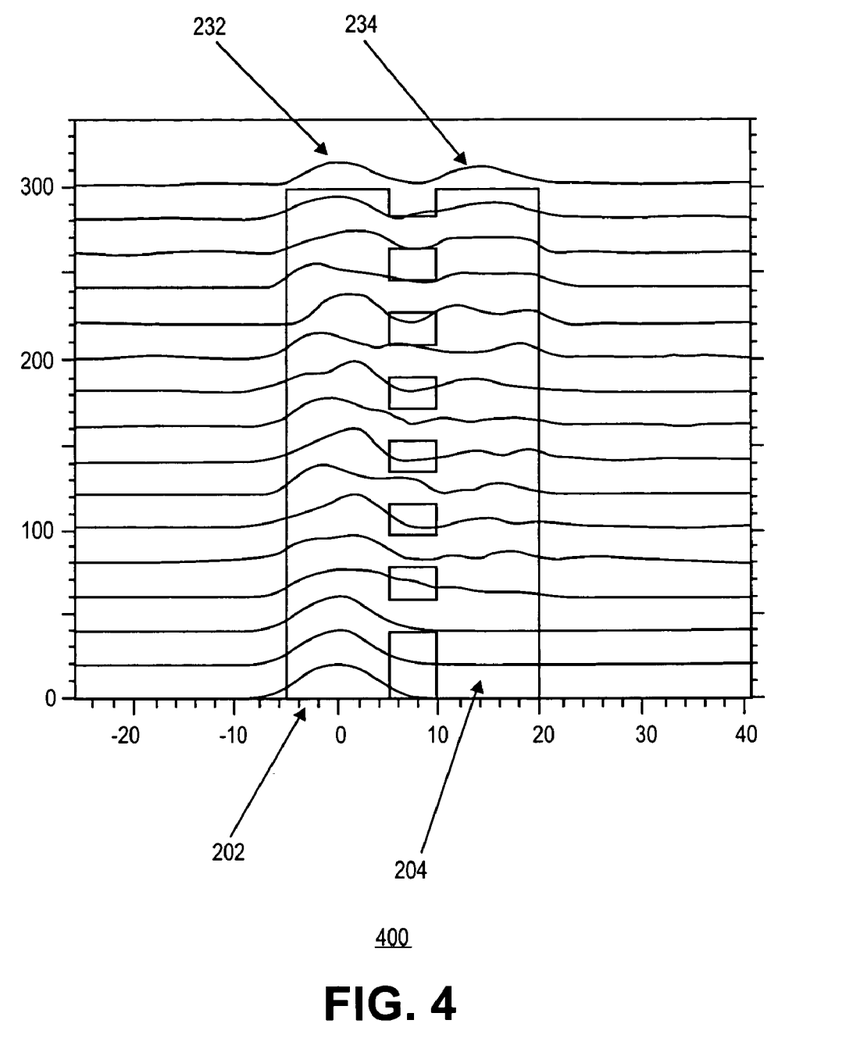
FIG. 4 is a schematic diagram showing a simulation of lateral dependence of a wave of a waveguide coupler according to an embodiment of the present invention.

FIG. 4 is a schematic diagram showing a simulation of lateral dependence of the wave 230 in the cross sections of the coupler 200 according to an embodiment of the present invention. In the illustrated embodiment, the coordinate scale is nanometers, the coupler 200 is twenty-five nanometers wide, and holes between the electron waveguides 210, 212, 214, 216, 218, 220, 222, and 224 connecting the waveguides 202 and 204 are 40×5 nanometers.

As FIG. 4 illustrates, the wave 230 is gently transferred from the left electron waveguide 202 to the right electron waveguide 204 preserving the phase of the electron wave. Thus a coherent combination of the left electron waveguide 202 and the right electron waveguide 204 states is created. The example simulation shows that electrons launched in the left electron waveguide 202 may be divided equally after propagating over three hundred nanometers and result in the electron wave 232 in the left electron waveguide 202 and the electron wave 234 in the right electron waveguide 204. Without the electron waveguides 210, 212, 214, 216, 218, 220, 222, and 224 connecting the waveguides 202 and 204 to form segments, evanescent coupling from one electron waveguide 202 to the other electron waveguide 204 would be negligible.

Returning back to FIG. 3, in a block 308, the electron wave 232 propagates in one arm 114 of the interferometer 112 and the electron wave 234 propagates in the other arm 116 of the interferometer 112.

In a block 310, a voltage is applied to the gate 128 from the voltage source 132. In one embodiment, applying the voltage to the gate 128 causes the wavelength λ of the electron wave 232 to change, and changing the wavelength λ also may change the phase φ of the electron traveling in the electron waveguide 202. In another embodiment, the voltage is applied to the gate electrode 130. In yet another embodiment, the opposite variation of voltage is applied to gate electrodes 128 and 130, which is referred to as a "push-pull" configuration.

For example, the wavelength of the electron wave 232 may be determined by the momentum p of the electron wave traveling in the electron waveguide 202. The momentum p of the electron wave 232 is equal to mass m times velocity v (p=mv). The applied electrostatic field performs work on the electron wave 232 and changes its velocity v The momentum p of the electron wave 232 traveling in the electron waveguide 202 also can be represented by p=ℏκ, where ℏ is Planck's constant and κ is the wave vector. The wave vector κ may be determined by 2π/λ for example. The phase φ of the electron wave 232 traveling in the electron waveguide 202, which may be accumulated over the path the electron wave 232 takes, may be represented by φ=2πχ/λ, where χ is the distance of propagation of the electron wave 232.

Thus, if the voltage on the gate 128 changes, the momentum p of the electron wave 232 changes. If the momentum p changes, the electron wave 232 wave vector κ changes. If the wave vector κ changes, the wavelength λ of the electron wave 232 changes. If the wavelength λ changes, the phase φ of the electron wave 232 changes.

In a block 312, at the output of the interferometer 112 and the input to the coupler 118, the electron waves 232 and 234 recombine into the electron wave 230 and thus the electron waves 232 and 234 interfere with each other. The result of interference depends on the relative phases of the wave 232 and 234. If the phases are different by an odd integer times π radians, we call the interference "destructive", if the phases are different by an even integer times π radians, we call the interference "constructive". The voltages applied to gate electrodes 128 and 130 result in switching from one situation to another.

Reference now will be now will be made to the coupler 200 to explain the operation of the coupler 118 according to an embodiment of the present invention. In a block 314, the electron waves 232 and 234 interfere constructively with each other and the coupler 200 couples the electron wave 232 to the waveguide 204 to recompose the electron wave 230. As the electron wave 232 propagates down the electron waveguide 202, portions of the electron wave 232 are leaked from the electron waveguide 202 to the electron waveguide 204 through the electron waveguides 210, 212, 214, 216, 218, 220, 222, and 224 so that at the outputs of the waveguides 202 and 204 the two separate electron waves 232 and 234 are recombined into the electron wave 230. In one embodiment, the addition of the coherent superpositions of waves with constructive interference results in zero probability of wave propagation in the waveguide 124. The completely recomposed electron wave 230 exits the port 126. In this embodiment, if the recomposed electron wave 230 with the constructive interference exits the port 126, the output may be interpreted as a logical "one" value or a logical "high" value.

In a block 316, the electron waves 232 and 234 interfere destructively with each other and the coupler 200 couples the electron wave 234 to the waveguide 202 to recompose the electron wave 230. As the electron wave 234 propagates down the electron waveguide 202, portions of the electron wave 234 are leaked from the electron waveguide 202 to the electron waveguide 204 through the electron waveguides 210, 212, 214, 216, 218, 220, 222, and 224 so that at the outputs of the waveguides 202 and 204 the two separate electron waves 232 and 234 are recombined into the electron wave 230. The recomposed electron wave 230 is not blocked at the output of the interferometer 112, but exits the port 124 if the interference is destructive. In one embodiment, if the recomposed electron wave 230 exits the port 124, the output may be interpreted as a logical "zero" value of a logical "low" value.

In one embodiment, the interference between the two electron waves 232 and 234 may be explained as follows. The complex component of the electron wave ikL may be expressed as ikL=cos(kL)+isin(kL), where isin(kL) is a complex form of expressing the sine of the electron wave, cos(kL) is a complex form of expressing the cosine of the electron wave, ikL is a complex form of expressing how the sine and the cosine of the electron wave interfere, k is the wave vector, and L is the length of the arm 114/116 being considered. The transmission amplitude t(E) in the two arms 114 and 116 may be represented by $t(E)=0.5*(\exp(ik_1L)+\exp(ik_2L))$, where the subscripts 1 and 2 represent the arm 114 and 116, respectively.

The absolute value of the transmission amplitude t(E) squared is the transmission probability $|t(E)|^2$, which is the probability that an electron will follow one path such as the electron waveguide 202 or another path such as the electron waveguide 204. The energy E of an electron in the electron wave 232 may be represented as $$E = \frac{\hbar^2 k^2}{2m} - eV_G,$$

where $V_G$ is the voltage applied to the gate 128.

The description is further complicated by the fact that in reality there are many electrons in the electron wave 232 in a solid and have ample time to interact with each other and/or indirectly, such as with phonons, impurities, and the like. Eventually, the electrons come into thermal equilibrium. The thermal equilibrium may be described by the Fermi function $f$, which indicates how many electrons exist in thermal equilibrium in a quantum state with a given energy. The Fermi function $f$ may be determined by $f=1/(1+\exp(E-\mu/k_BT))$, where $\mu$ is the chemical potential that depends on the density of electrons in the solid and the electrical potential in a waveguide, $k_B$ is Boltzmann's distribution function, and T is temperature. In one embodiment, at high temperatures, the Fermi function $f$ tends towards Boltzmann's distribution. The electrical potential in the waveguide is in its turn determined by the voltage applied between the input and output of the switch.

Figure 5:
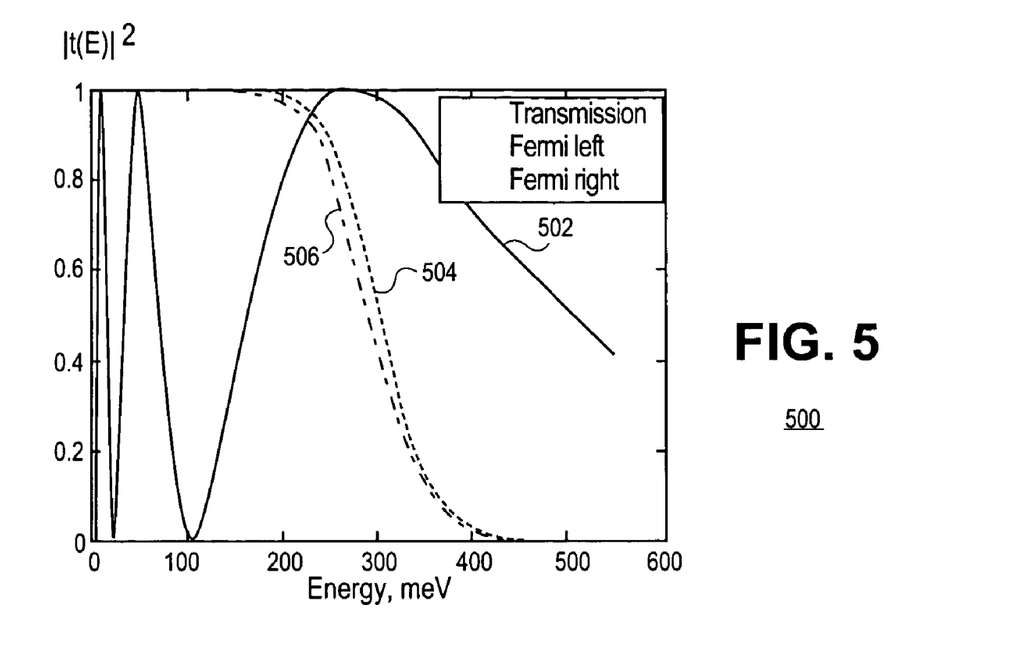
FIG. 5 is a graphical representation illustrating transmission probability as a function of electron energy of a quantum interference switch according to an embodiment of the present invention.

FIG. 5 is a graphical representation 500 illustrating transmission probability $|t(E)|^2$ as a function of energy E in the switch 100 according to an embodiment of the present invention. In the illustrated embodiment, the graphical representation 500 includes a curve 502, which represents the transmission probability $|t(E)|^2$. A curve 504 represents the Fermi function $f$ of the left arm 114 and a curve 506 represents the Fermi function $f$ of the right arm 116. In the illustrated embodiment, it can be seen that the difference of the Fermi functions are narrowly peaked close to the Fermi energy $E_F$=300 meV for each of the Fermi functions.

Current I in the switch 100 may be determined by the Fermi distributions on the left and on the right of the switch and may be represented by $$I = \frac{-e}{\pi\hbar} \int dE |t(E)|^2 (f_L(E) - f_R(E)),$$

e represents the absolute value of the electron charge, $f_L(E)$ represents the Fermi function in the left arm 102, and $f_R(E)$ represents the Fermi function in the right arm 126. Thus, to determine the total current I going through the switch 100 one may integrate over all energies the transmission probability $|t(E)|^2$ through the switch 100 and the difference of Fermi distribution functions $(f_L(E)-f_R(E))$.

Figure 6:
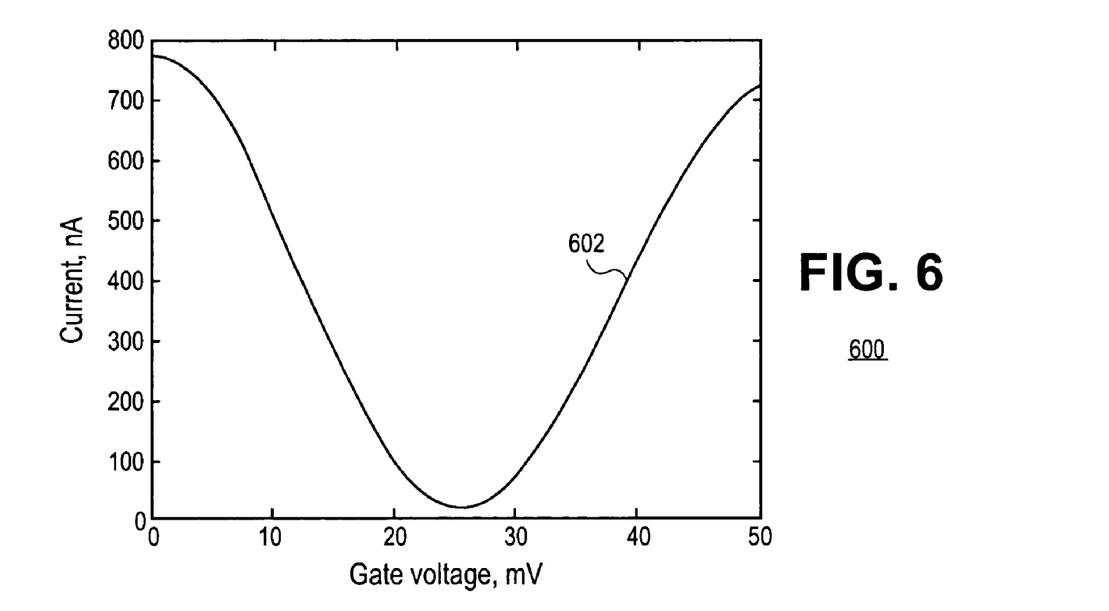
FIG. 6 is a graphical representation illustrating current and voltage characteristics of a quantum interference switch according to an embodiment of the present invention.

FIG. 6 is a graphical representation 600 illustrating current and voltage characteristics of the switch 100 according to an embodiment of the present invention. In the illustrated embodiment, the graphical representation 600 includes a curve 602, which represents the current I through the interferometer 112 versus the voltage $V_G$ applied to gate 128. FIG. 600 illustrates that interference still exhibits deep and sharp fringes versus gate even as the distribution of electrons over energies is factored in.

In one embodiment, the mass m of an electron is m=0.07 $m_e$, T=300K, the phase π necessary for switching only takes an arm 114/116 length L of L=100 nm, and change of voltage $\Delta V_G$ applied to the gate of $\Delta V_G$=25 mV.

Although embodiments of the present invention have been described with reference to the electron wave being injected into the top port 102, an electron wave may be injected into the bottom port 104. In this embodiment, the switch 100 may function in a manner that is the reverse of what has been described.

In one embodiment, the switch 100 may switch the electrons in the solid state, such as for logic operations on a computer.

In a block 318, the process 300 finishes.

The operations of the process 300 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the process 300 is an example process and other processes may be used to implement embodiments of the present invention. A machine-accessible medium with machine-readable data thereon may be used to cause a machine, such as, for example, a microprocessor, to perform the process 300.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as recess as electrical, optical, acoustic, or other form of propagated signals (e.g., carrier waves, infrared signals, digital signals, etc.).

Figure 7:
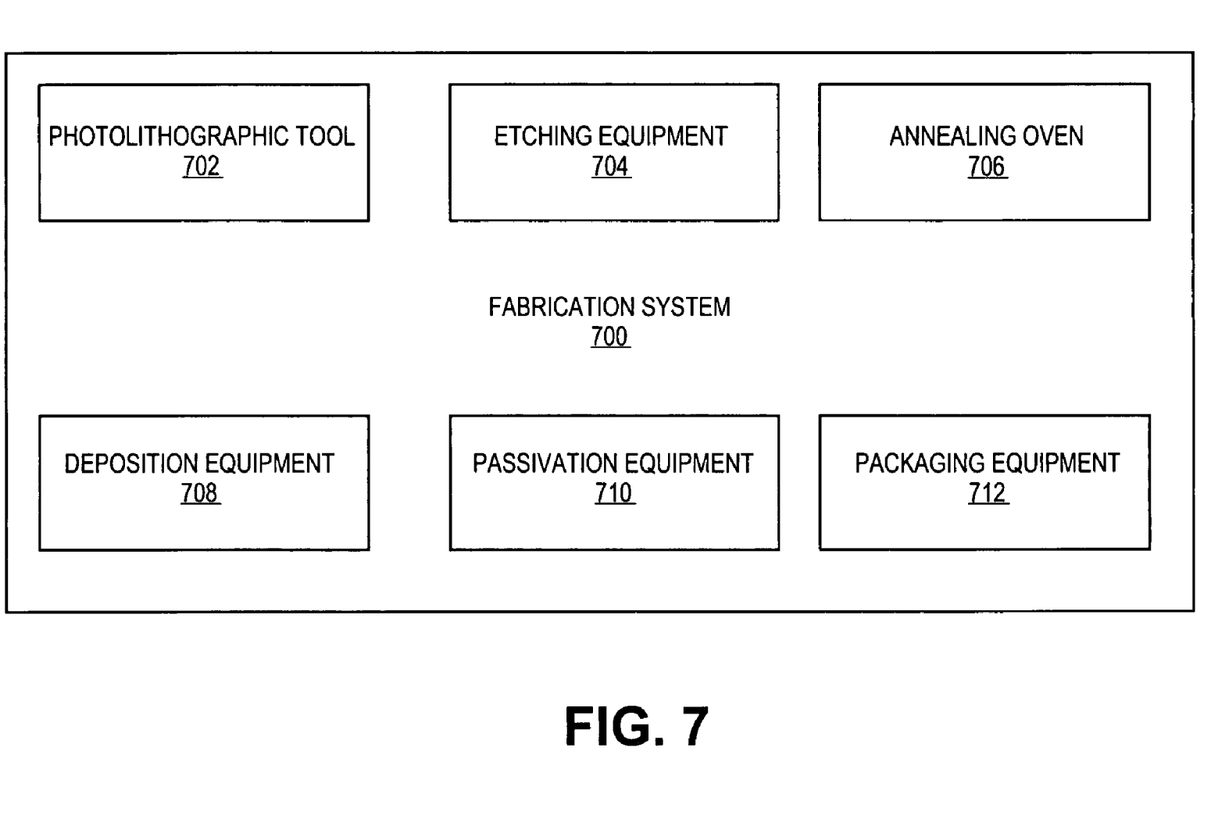
FIG. 7 is a high level block diagram of a system for fabricating a quantum interference switch according to an embodiment of the present invention.

FIG. 7 is a high level block diagram of a system 700 that may be used to fabricate the switch 100 according to an embodiment of the present invention. Operation of the system 700 is described with reference to FIG. 8, which is a cross-section diagram illustrating the switch 100 according to an embodiment of the present invention, and to FIG. 9, which is a flow chart illustrating a process 900 for fabricating the switch 100 according to an embodiment of the present invention.

Figure 8:
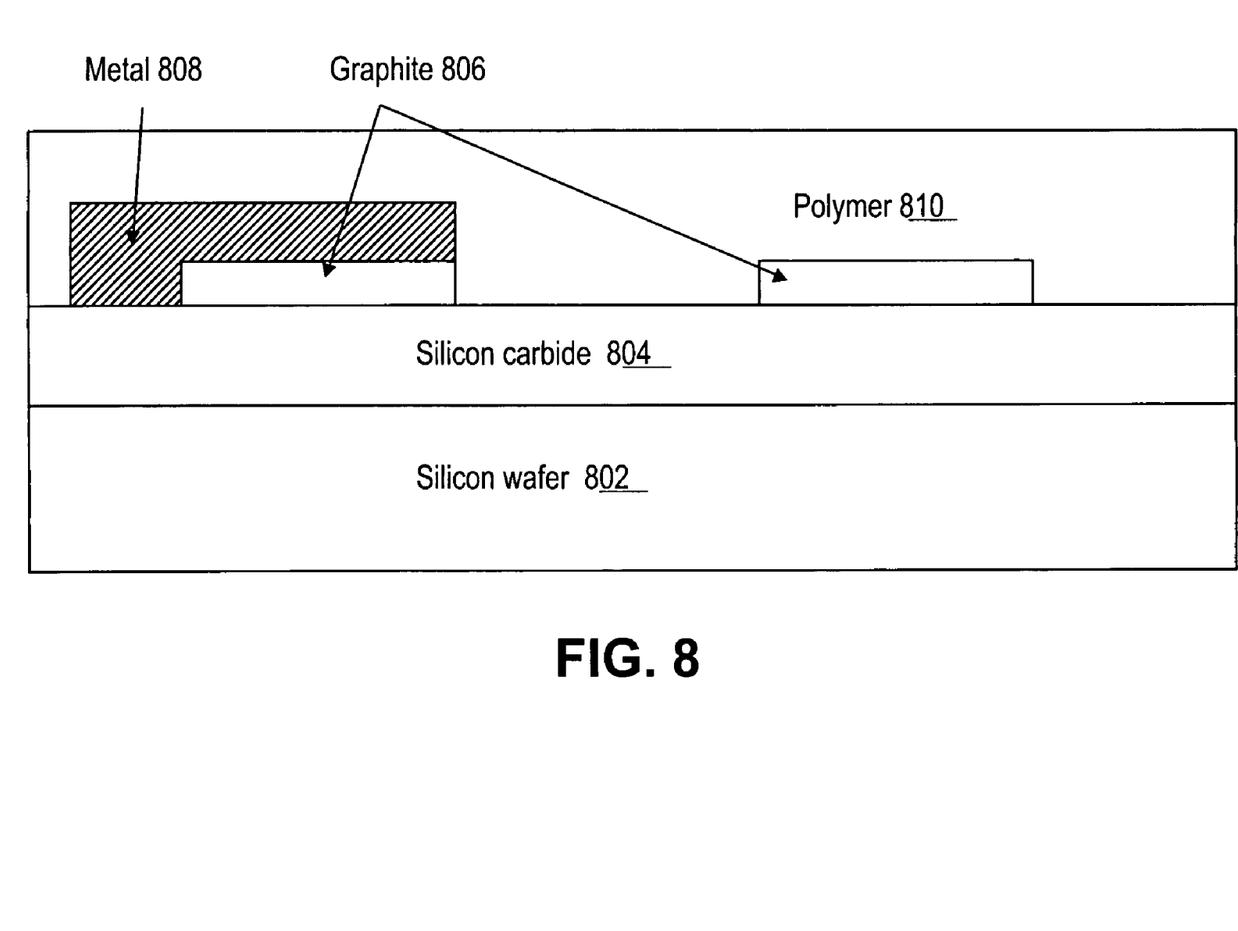
FIG. 8 is a cross-section diagram illustrating a quantum interference switch according to an embodiment of the present invention.
Figure 9:
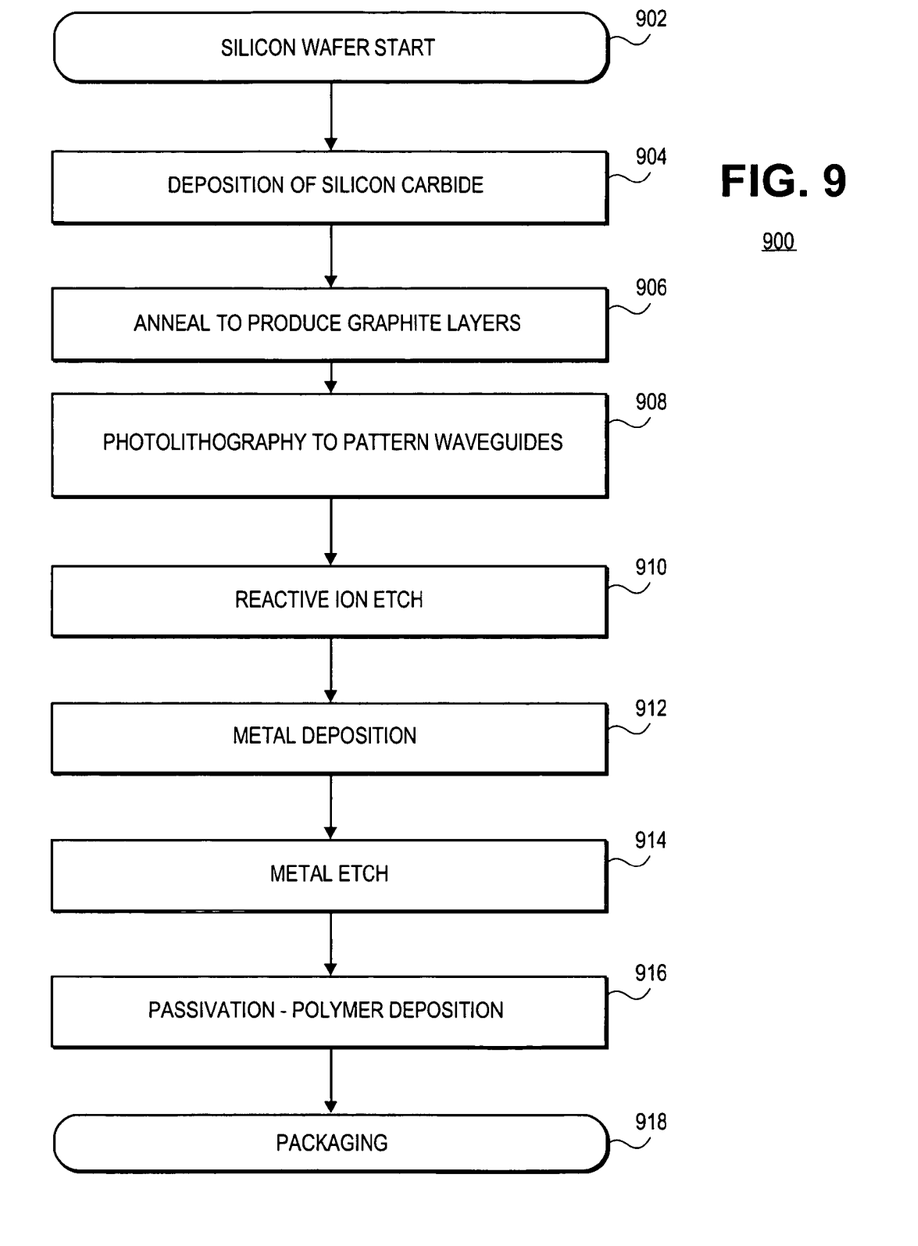
FIG. 9 is a flow chart illustrating an approach to fabricating a quantum interference switch according to an embodiment of the present invention

In the illustrated embodiment, the system 700 includes a photolithographic tool 702, such as an electron beam, etching equipment 704, such as for example, plasma etching or reactive ion etching equipment, an annealing oven 706, deposition equipment 708, passivation equipment 710, and packaging equipment 712. In embodiment illustrated in FIG. 8, the switch 100 includes a silicon wafer 802. In a block 902, the process 900 begins with a silicon wafer 802.

In a block 904, a layer of silicon carbide 804 may be deposited on the silicon wafer 802, by the deposition equipment 708, for example.

In a block 906, the silicon wafer 802 with the layer 804 of silicon carbide may be annealed to produce one or more layers 806 of graphite. In one embodiment, annealing may be accomplished by placing the silicon wafer 802 with the layer 804 of silicon carbide in the annealing oven 706, for example.

In a block 908, waveguides may be patterned in the graphite layers 806, using the photolithographic tool 702, for example.

In a block 910, unwanted graphite may be removed, using the etching equipment 704, for example, to reveal the patterned waveguides. In one embodiment, the etching equipment may be reactive ion etching (RIE) equipment.

In a block 912, a layer 808 of metal may be deposited on one or more of the graphite waveguides, using the deposition equipment 708, for example.

In a block 914, the layer 808 may be etched, using metal etching equipment, for example, to reveal a contact for the graphite waveguides.

In a block 916, the switch 100 as fabricated so far may be passivated and a polymer 810 deposited on thereon. In one embodiment, the passivation equipment 710 may passivate the switch 100 and the deposition equipment 708 may deposit the polymer, which may provide an insulating layer.

In a block 918, the switch 100 may be packaged, using packaging equipment 712, for example.

Embodiments of the present invention may be implemented using hardware, software, or a combination thereof. In implementations using software, the software may be stored on a machine-accessible medium.

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
an interferometer disposed on a base;
a first coupler to receive an electron wave from a first input port of the interferometer and to split the electron wave into a first wave and a second wave, the interferometer having a first arm to receive the first wave and a second arm to receive the second wave; and
a second coupler to receive the first and the second waves from the first and the second arms of the interferometer, respectively, to guide the first and the second waves to a first output port of the interferometer if the interference of the first and the second waves is destructive, and to guide the first and the second waves to a second output port of the interferometer if the interference of the first and the second waves is constructive.

2. The apparatus of claim 1, wherein the interferometer further comprises a gate electrode coupled to the first arm of the interferometer, the gate electrode to receive a voltage from a voltage source, the voltage to cause a phase difference between the first and the second waves, the phase difference to cause the interference between the first and the second waves to be destructive.

3. The apparatus of claim 2, wherein the interferometer further comprises a second gate electrode coupled to the second arm of the interferometer, the second gate electrode to receive a second voltage from a second voltage source, the second voltage to cause a second phase difference between the first and the second waves, the second phase difference to contribute to or detract from the destructive interference between the first and the second waves.

4. The apparatus of claim 1, wherein the interferometer further comprises a gate electrode coupled to the first arm of the interferometer, the gate electrode to receive a voltage from a voltage source, the voltage to cause a phase difference between the first and the second waves, the phase difference to cause the interference between the first and the second waves to be constructive.

5. The apparatus of claim 4, wherein the interferometer further comprises a second gate electrode coupled to the second arm of the interferometer, the second gate electrode to receive a second voltage from a second voltage source, the second voltage to cause a second phase difference between the first and the second waves, the second phase difference to contribute to or detract from the constructive interference between the first and the second waves.

6. The apparatus of claim 1, wherein the first and/or the second coupler comprise graphite wire.

7. The apparatus of claim 1, wherein the first and/or the second couplers comprise:
a first electron waveguide disposed on the base;
a second electron waveguide disposed on the base substantially parallel to the first electron waveguide and electrically insulated from the first electron waveguide; and
a third set of electron waveguides disposed on the base, individual electron waveguides in the third set of electron waveguides being disposed perpendicular to the first and the second electron waveguides, individual electron waveguides in the third set of electron waveguides being disposed sequentially in relation to the longitudinal axis of the first and the second electron waveguides, wherein the first electron wave is to propagate in the first electron waveguide, the second electron wave is to propagate in the second electron waveguide, and the third set of electron waveguides is to couple the second wave from the first electron waveguide to the second electron waveguide.

8. An apparatus, comprising:
a first electron waveguide disposed on a base, the first electron waveguide to propagate an electron having an electron wave;
a second electron waveguide disposed on the base substantially parallel to the first electron waveguide and electrically insulated from the first electron waveguide; and
a third set of electron waveguides disposed on the base, individual electron waveguides in the third set of electron waveguides being disposed perpendicular to the first and the second electron waveguides, individual electron waveguides in the third set of electron waveguides being disposed sequentially in relation to the longitudinal axis of the first and the second electron waveguides, wherein the third set of electron waveguides is to couple a first nonzero percentage of the electron wave to propagate in the second electron waveguide, and wherein a second percentage of the electron wave is to remain propagating in the first electron waveguide.

9. The apparatus of claim 8, wherein the electron waveguides comprise graphite.

10. The apparatus of claim 9, wherein the base comprises a silicon carbide wafer.

11. The apparatus of claim 8, further comprising an insulating material disposed around the first and the second electron waveguides.

12. The apparatus of claim 11, wherein the electrically insulating material is further disposed around individual electron waveguides in the third set of waveguides.

* * * * *